United States Patent
Geissler et al.

(10) Patent No.: US 12,063,511 B2
(45) Date of Patent: Aug. 13, 2024

(54) PATHLOSS DROP TRUSTED AGENT MISBEHAVIOR DETECTION

(71) Applicant: Intel Corporation, Santa Clara, CA (US)

(72) Inventors: Florian Geissler, Munich (DE); S M Iftekharul Alam, Hillsboro, OR (US); Yaser M. Fouad, Hillsboro, OR (US); Michael Paulitsch, Ottobrunn (DE); Rafael Rosales, Unterhaching (DE); Kathiravetpillai Sivanesan, Portland, OR (US); Kuilin Clark Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 17/130,631

(22) Filed: Dec. 22, 2020

(65) Prior Publication Data
US 2021/0112417 A1    Apr. 15, 2021

(51) Int. Cl.
| H04W 12/104 | (2021.01) |
| H04W 4/40 | (2018.01) |
| H04W 12/00 | (2021.01) |

(52) U.S. Cl.
CPC ........... *H04W 12/104* (2021.01); *H04W 4/40* (2018.02); *H04W 12/009* (2019.01)

(58) Field of Classification Search
CPC .... H04W 12/104; H04W 4/40; H04W 12/009
See application file for complete search history.

(56) References Cited

U.S. PATENT DOCUMENTS

| 11,516,669 B2 * | 11/2022 | Shimizu ................. H04W 4/40 |
| 11,641,644 B2 * | 5/2023 | Badic ..................... H04W 40/24 370/329 |

(Continued)

FOREIGN PATENT DOCUMENTS

| EP | 2743726 | 6/2014 |
| EP | 3448072 | 2/2019 |

OTHER PUBLICATIONS

"European Application Serial No. 21209076.5, Response filed Nov. 9, 2022 to Extended European Search Report mailed May 10, 2022", 11 pgs.

(Continued)

*Primary Examiner* — Jerry B Dennison
(74) *Attorney, Agent, or Firm* — Schwegman Lundberg & Woessner, P.A.

(57) ABSTRACT

V2X trusted agents provide technical solutions for technical problems facing falsely reported locations of connected vehicles within V2X systems. These trusted agents (e.g., trusted members) may be used to detect an abrupt physical attenuation of a wireless signal and determine whether the attenuation was caused by signal occlusion caused by the presence of an untrusted vehicle or other untrusted object. When the untrusted vehicle is sending a message received by trusted agents, these temporary occlusions allow trusted members to collaboratively estimate the positions of untrusted vehicles in the shared network, and to detect misbehavior by associating the untrusted vehicle with reported positions. Trusted agents may also be used to pinpoint specific mobile targets. Information about one or more untrusted vehicles may be aggregated and distributed as a service.

21 Claims, 11 Drawing Sheets

(56) References Cited

U.S. PATENT DOCUMENTS

| | | | | |
|---|---|---|---|---|
| 11,653,220 | B2* | 5/2023 | Zhao | H04W 4/02 370/329 |
| 11,708,070 | B2* | 7/2023 | Shimizu | B60W 30/09 701/45 |
| 11,928,011 | B2* | 3/2024 | Tabet | G06F 11/3428 |
| 2015/0200957 | A1* | 7/2015 | Zhang | G08G 1/163 726/22 |
| 2020/0137580 | A1* | 4/2020 | Yang | H04W 4/46 |
| 2020/0374342 | A1* | 11/2020 | Chen | H04W 4/44 |
| 2021/0107152 | A1* | 4/2021 | Honkote | G05B 19/4183 |
| 2021/0112417 | A1* | 4/2021 | Geissler | H04W 12/104 |
| 2023/0184877 | A1* | 6/2023 | Barbu | G01S 5/0205 455/456.1 |
| 2023/0199669 | A1* | 6/2023 | Vannithamby | H04W 52/365 455/127.1 |
| 2023/0300579 | A1* | 9/2023 | Merwaday | H04W 4/44 701/423 |

OTHER PUBLICATIONS

Ambrosin, Moreno, "Design of a Misbehavior Detection System for Objects Based Shared Perception V2X Applications", 2019 IEEE Intelligent Transportation Systems Conference (ITSC), (2019), 1165-1172.

Del Peral-Rosado, Jose, "Network Design for Accurate Vehicle Localization", IEEE Transactions on Vehicular Technology, vol. 68, No. 5, (May 2019), 4316-4327.

He, R, "Vehicle-to-vehicle propagation models with large vehicle obstructions", IEEE Trans. Intell. Transp. Syst., vol. 15, No. 5, (Oct. 2014), pp. 2237-2248.

Ji, X, "Overview of 5G security technology", Sci. China Inf. Sci., vol. 61, No. 8, (2018), pp. 1-25.

Liu, L, "A comparison of communication mechanisms in vehicular edge computing", HotEdge 2020—3rd USENIX Work. Hot Top. Edge Comput, (2020).

Meinila, J, "Winner II Channel Models", Radio Technol. Concepts IMT-Advanced, vol. 1 , No. 82, (2010), pp. 39-92.

Zhou, Haibo, "Evolutionary V2X Technologies Toward the Internet of Vehicles: Challenges and Opportunities", Proceedings of the IEEE vol. 108, No. 2, (Feb. 2020), 308-323.

"European Application Serial No. 21209076.5, Extended European Search Report mailed May 10, 2022", 11 pgs.

"Channel Models for eV2X Evaluation Methodology", Intel Corporation: 3GPP Draft; R1-1806539 Intel—EV2X Channel, 3rd Generation Partnership Project (3GPP), Mobile Competence Centre ; 650, Route Des Lucioles ; F-06921 Sophia-Antipolis Cedex ; France vol. RAN WG1, No. Busan, Korea, http:www.3gpp.org ftp Meetings%5F3GPP%5FSYNC RAN1 Docs , (May 20, 2018), May 21, 2018-May 25, 2018.

* cited by examiner

PATHLOSS DROP TRUSTED AGENT MISBEHAVIOR DETECTION

TECHNICAL FIELD

Embodiments described herein generally relate to connected transportation services.

BACKGROUND

Vehicle-to-everything (V2X) communication may be used to transmit and receive data among a system of network-connected vehicles, access points, and V2X infrastructure. V2X communication provides a technology backbone for self-driving vehicles (e.g., autonomous vehicles, robotaxis), and may be used to provide Mobility-as-a-Service (MaaS) functionality to enable users to research, reserve, and pay for mobility services.

V2X may include periodic (e.g., every ~100 ms) data messages sent to or from a vehicular user equipment (VUE) device within a connected vehicle. The messages may include basic safety messages (BSMs), cooperative awareness messages (CAMs), presence alert messages, or other messages. However, threats to both security and road safety arise when vehicles send false locations due to faulty sensors or security attacks, essentially creating non-existent "ghost" vehicles. Apart from immediate risks for the surrounding environment, this "misbehavior" jeopardizes MaaS transport solutions, causing bad customer experience and increased operational burden on the service providers. In an example, when a user requests a vehicle in a location, the MaaS system checks the location and availability of vehicles and dispatches the vehicle that is closest to the current location of the user. If the MaaS system acts on incorrect vehicle location information, the user's request may be delayed or may not be fulfilled at all. What is needed is improved solutions for detection of falsely reported locations of connected vehicle.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

V2X trusted agents provide technical solutions for technical problems facing falsely reported locations of connected vehicles within V2X systems. These trusted agents (e.g., trusted members) may be used to detect an abrupt physical attenuation of a wireless signal and determine whether the attenuation was caused by signal occlusion caused by the presence of an untrusted vehicle or other untrusted object. When the untrusted vehicle is sending a message received by trusted agents, these temporary occlusions allow trusted members to collaboratively estimate the positions of untrusted vehicles in the shared network, and to detect misbehavior by associating the untrusted vehicle with reported positions. Trusted agents may also be used to pinpoint specific mobile targets. Information about one or more untrusted vehicles may be aggregated and distributed as a service.

This use of V2X trusted agents improves V2X security by detecting misbehavior signaling of potential attackers, thereby enhancing V2X system safety and security. These trusted agents provide system improvements to operators of autonomous vehicle fleets with V2X and edge support. These trusted agents also provide system improvements to MaaS systems, which rely on correct signaling for the efficient planning of trips and schedules.

In the following description, for purposes of explanation, numerous specific details are set forth in order to provide a thorough understanding of some example embodiments. It will be evident, however, to one skilled in the art that the present disclosure may be practiced without these specific details.

Figure 1:
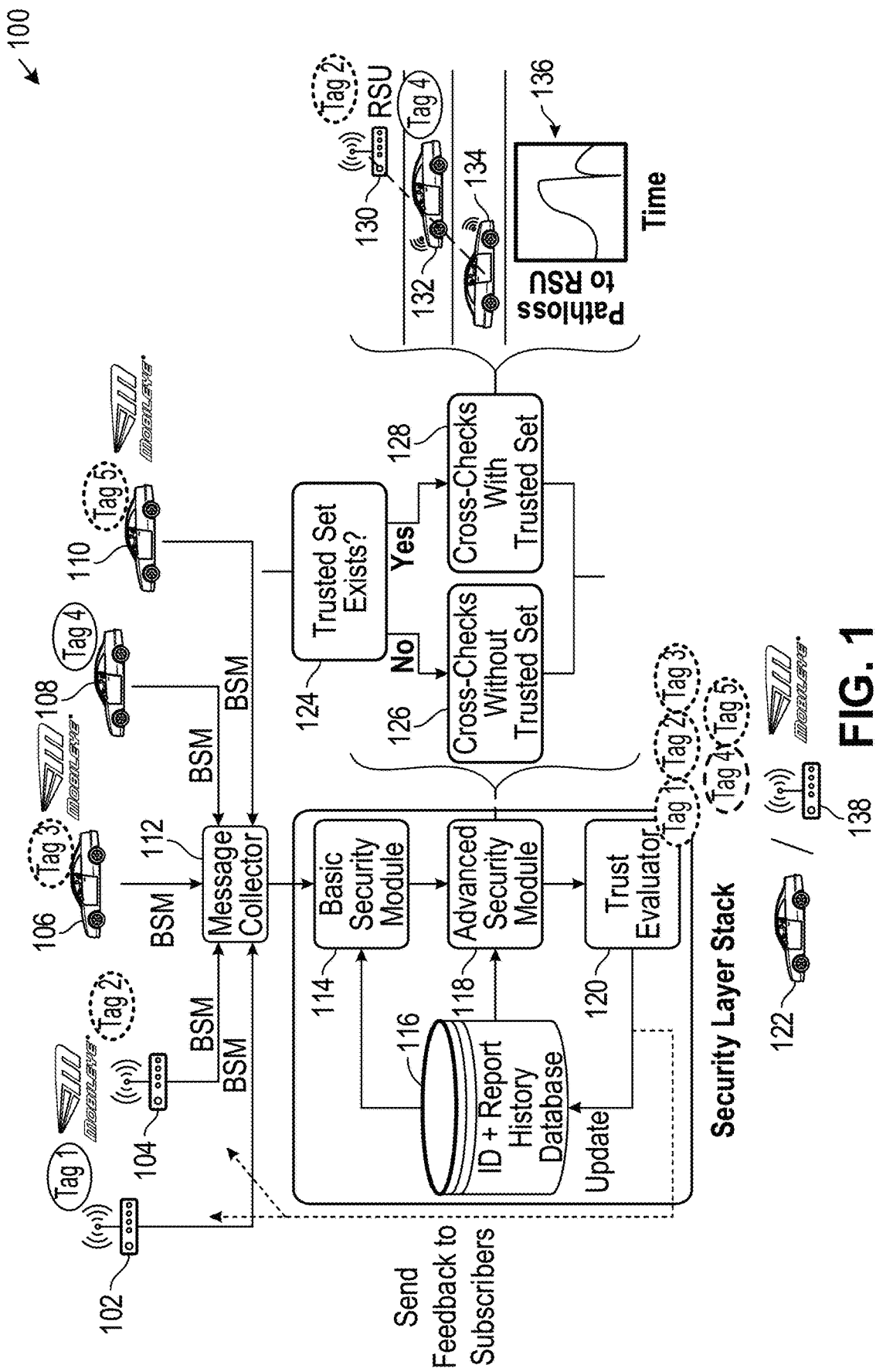
FIG. 1 is a schematic drawing illustrating a V2X misbehavior detection system, according to an embodiment.

FIG. 1 is a schematic drawing illustrating a V2X misbehavior detection system 100, according to an embodiment. System 100 includes n centralized misbehavior detection and distribution service, which may be used to provides improved detection of misbehavior directly by detecting occlusion of the received physical-layer signal. In an example shown in the righthand side of FIG. 1, when untrusted vehicle 132 crosses the line-of-sight (LoS) between RSU 130 and trusted vehicle 134, the wireless signal exchanged between RSU 130 and trusted vehicle 134 exhibits an abrupt drop in the signal strength (e.g., ~15 dBm) due to the physical attenuation caused by the body of untrusted vehicle 132. An example of this pathloss signal strength drop can be seen in graph 136 and in FIG. 2.

Figure 2:
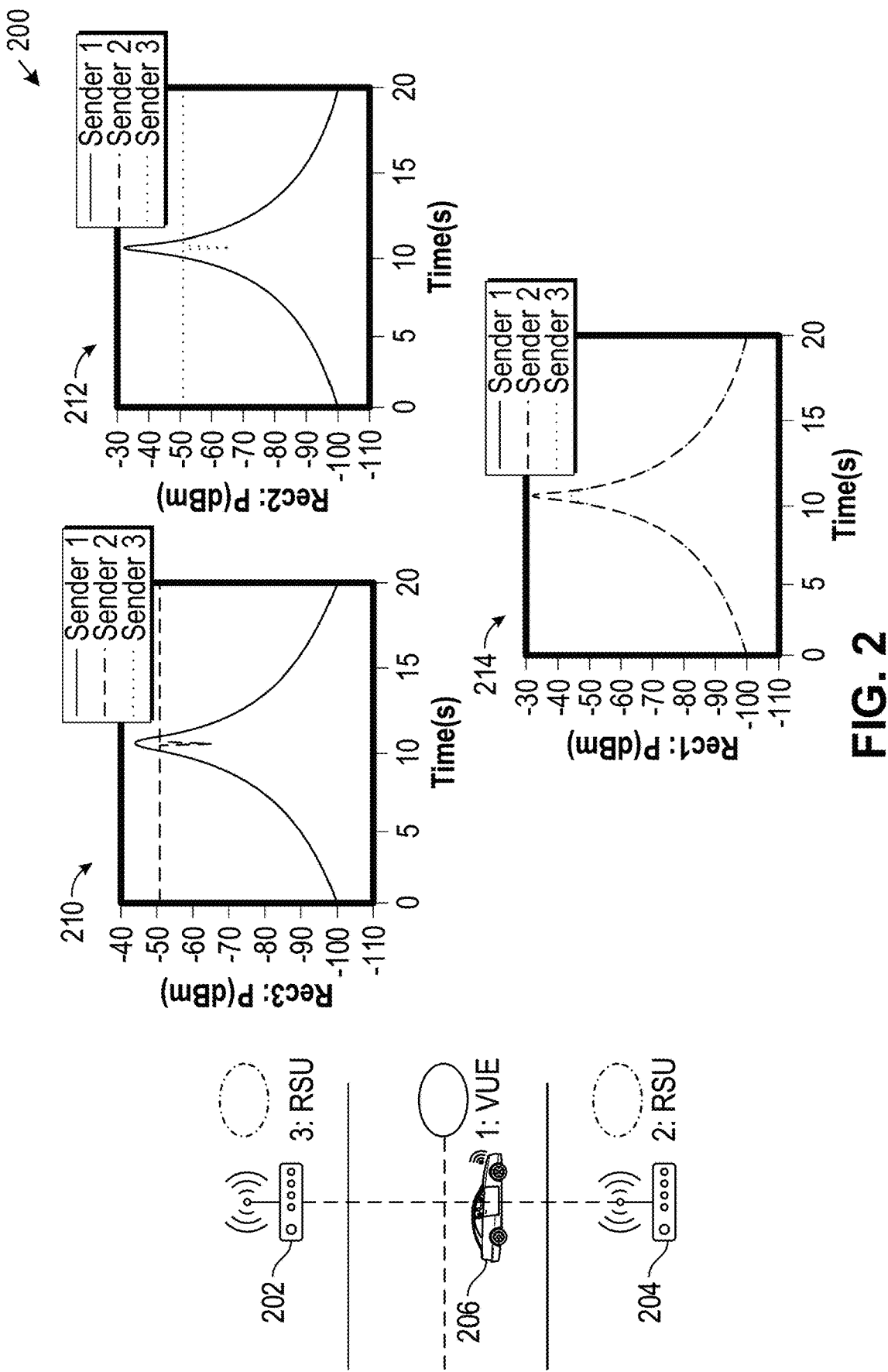
FIG. 2 is a schematic drawing illustrating a first V2X occlusion mechanism, according to an embodiment.

As shown in FIG. 1, position and other information may be transmitted to message collector 112 from MaaS trusted agents (e.g., MaaS trusted vehicles, MaaS trusted members), such from roadside units (RSUs) 102, 104, and 130, and from vehicular user equipment (VUE) vehicles 106, 108, 110, and 134. The information may be transmitted using BSMs, CAMs, or other similar messages. System 100 may be used with various combinations of stationary and mobile devices, such as trusted infrastructure edge devices as shown in FIG. 2 or mobile vehicular devices shown in FIG. 4.

Each trusted device within system 100 may include a message collector 112, which receives and decodes messages from an untrusted vehicle and from a controlled trusted set of trusted RSUs or VUEs. The message collector 112 reads the content of the messages (e.g., position, speed, trajectory) and the physical layer characteristics (e.g., received signal strength indicator (RSSI), angle of arrival (AoA), time of flight (ToF), etc.).

Figure 6:
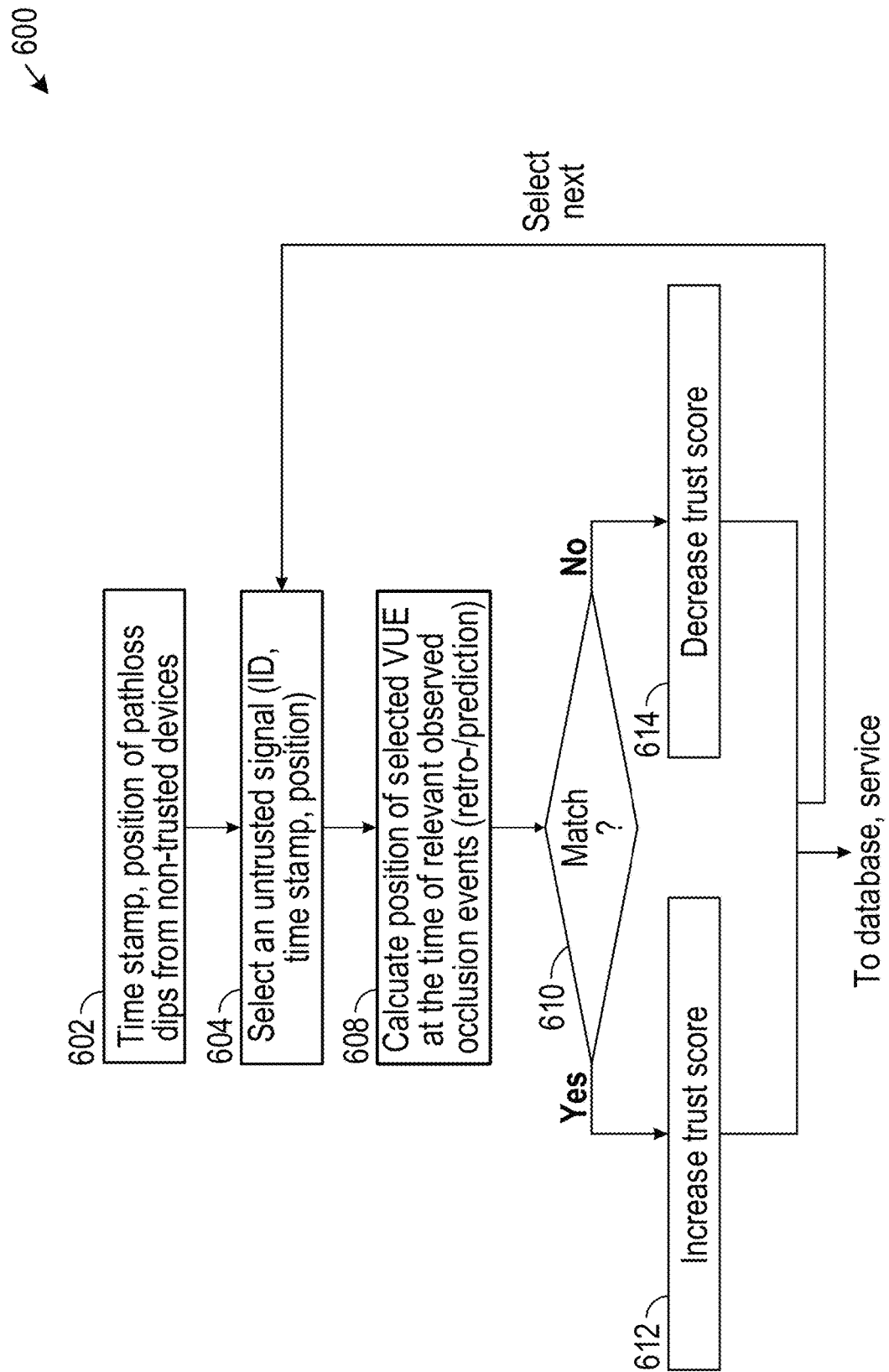
FIG. 6 is a flowchart of a trust evaluator module method, according to an embodiment.

Each trusted device within system 100 may include an internal database 116 to store a list of authorized distribution nodes and to store information associated with each of the other network members, such as IDs, trust scores and recent position history. Each trust score consists of at least three discrete trust levels, such as malicious, untrusted, and trusted. Each trusted device within system 100 may begin with an initial trust level configuration that is defined by an initial watch-out list, or may begin with all vehicles at an untrusted level if no watch-out list is available. Each vehicle trust score may be adjusted between adjacent trust levels based on a match or mismatch between reported position and detected position, such as shown in FIG. 6.

Each trusted device within system 100 may include a basic security module 114, which performs security checks on information collected by the message collector 112. These security checks may include key-based authentication, RSSI analysis, AoA analysis, ToF analysis, position history analysis, and verification of reported position (e.g., identification of positions reported from non-accessible regions according to map).

Each trusted device within system 100 may include an advanced security module 118, which may be used to analyze information received from untrusted vehicles. The advanced security module 118 uses information from the internal database 116 as an input, provides additional analysis beyond that of the basic security module 114, and improves the integrity of the received messages. The advanced security module 118 may be used to determine whether a trusted vehicle set exits 124, and may cross-check (e.g., analyze) received vehicle information without the trusted set 126 or with the trusted set 128. Each RSU or VUE within system 100 benefits from this trusted vehicle set, which provides useful information about the perceived physical layer signals at different locations to a requesting entity.

The trusted vehicle set may include a set of a priori trusted devices, which includes devices that are initially trusted due to an a priori confidence in the integrity of this device. This set of a priori trusted devices may include devices from a trusted authority, where detailed knowledge of the device components, settings, and quality standards are known and frequently controlled (e.g., via online status pings or sanity checks). For example, devices that belong to the same manufacturer may add each other as trusted devices. RSUs maintained by a central trustworthy authority may also be initialized as within the set of a priori trusted devices.

The trusted vehicle set may include a set of dynamically assigned trusted devices. The trust evaluator 120 may continuously assess the trust score of untrusted vehicles and other untrusted participants in the environment. If other untrusted devices display correct behavior over a given authentication period, and their trust score is thus sufficiently high, that vehicle may be added to the set of dynamically assigned trusted devices. Vehicles included in the set of dynamically assigned trusted devices have passed higher layer authentication and verification of the basic security module 114 to ensure integrity. These included vehicles also have passed physical-layer-based authentication, indicating that the calculated trust score has been sufficiently high for a predetermined time.

Each trusted device within system 100 may include a trust evaluator 120, which may be used to identify pathloss events associated with an untrusted vehicle and assign or update a trust level (e.g., trust score) associated with the untrusted vehicle. For each trusted device within system 100, the output of the advanced security module 118 may be fed into a trust evaluator 120, which calculates trust scores for all other devices based on the collected information. It updates the internal database 116, including updated trust scores and latest reported positions. The ID and report history database 116 may be used to collectively gather trust scores and other misbehavior information, and to share anonymized vehicle with trusted vehicles so that each trusted member maintains an updated misbehavior list. A list of untrusted vehicles (e.g., a "watch-out" list) identifying potential attackers may be distributed to other road agents that subscribe to this service, such as through an authorized edge node. If a device is authorized as a distribution node, the output of the trust evaluator may be aggregated and distributed as a service to subscribers.

The use of an advanced security module 118 and the trust evaluator 120 may be used to detect the use of systems and methods described herein. In an example, the use of these systems and methods may be indicated by a system of VUEs or RSUs that exchanges BSMs or other messages over the air, such as between the devices requesting additional information and the other VUEs or RSUs that are in the trusted set. Another indication may include the detection of pathloss drops may be observed by an external observer (e.g., positioned to observe occlusion), which may be correlated with received messages. Another indication may include intentional simulation of misbehavior (e.g., by pointing a directed antenna to a reflecting surface, blocking the line of sight between two devices) to provoke a system alert message identifying the presence of an unknown vehicle. Another indication may include a standardized message format included in documentation to allow for information forwarding between the nodes, which may indicate the collection of characteristics of the physical layer signals received at different nodes.

The analysis of pathloss signal strength drop provided by system 100 provides various advantages over other systems. By using the physical layer, system 100 avoids reliance on higher layer authentication, such as used in key-based encryption systems. By using a network of MaaS trusted agents, system 100 avoids errors caused by intentionally falsified positions using directional antennas and reflecting surfaces, such as in systems that rely exclusively on time of flight (ToF) or angle-of-arrival (AoA) systems to estimate the position of the sender. System 100 may also use ToF or AoA information to augment or verify positional or directional information while avoiding pitfalls associated with systems that rely exclusively on ToF or AoA information. By using localized analysis (e.g., occlusion detection between two trusted agents), system 100 avoids reliance on network-wide transfer of entire object lists, such as used in shared perception systems.

FIG. 2 is a schematic drawing illustrating a first V2X occlusion mechanism 200, according to an embodiment. The V2X occlusion mechanism 200 may use trusted network members to estimate the location of unknown signaling objects. As shown in FIG. 2, two trusted RSUs 202 and 204 are positioned at each side of the road. When a yet untrusted VUE 206 travels along the road, it blocks the LoS between the two trusted entities RSUs 202 and 204, leaving a pathloss dip in the respective received power. This pathloss dip may be seen in the RSU received power graphs 210 and 212. RSU received power graphs 210 and 212 were generated using simulation parameters shown in Table 1 below:

TABLE 1

Summary of Parameters Used in Simulation
Simulation Parameters

| Time resolution | 0.1 s |
| Wireless pathloss model | 3GPP highway |
| Angular occlusion limit | 1e−3 rad |
| Receiver and sender height | 1.5 m |

The physical attenuation (e.g., gradual loss of intensity of the electromagnetic wave during spatial propagation) of a wireless signal depends strongly on the underlying medium. When the signal travels through a rigid body like the one of a human or a car, this attenuation is significantly higher than during propagation through air. For vehicles, the metallic vehicle components also reflect a significant portion of the signal. When the direct line of sight (LoS) between the sender and the receiver is occluded by such a body, the pathloss reflects this reduction in received power. In some situations, the remaining signal strength may be so weak that the predominant contribution is due to multipath reflections. Experimental data suggest that the difference in power magnitude may be on the order of 15 dBm. If the occluding object is moving, the additional pathloss may occur only during a short time interval, resulting in pronounced intensity drops of the wireless signal, such as shown in RSU received power graphs 210 and 212.

By detecting these pathloss dips, the RSUs may determine that the unknown object was located in the direct LoS between the two devices at the time of the pathloss dip. This time determination provides one parameter of the two-dimensional position with high confidence, such as the horizontal position of VUE 206 in FIG. 2. Another position parameter may be extracted by comparing the power of the two receiving stations shared between trusted members, which may be used to estimate the vertical position of VUE 206 in FIG. 2. Additionally, the road geometry and the spatial distance between the two trusted devices typically confine the space of possible coordinates sufficiently to arrive at a useful estimate. In the example of FIG. 2, there are only two likely vehicle locations in the LoS, corresponding to the two lanes of the road. Additional location parameters may be estimated based on the presence of additional trusted members.

Additional steps may be taken to improve the ability of first V2X occlusion mechanism 200 to detect a pathloss dip. The RSUs may be positioned to reduce or eliminate environmental influence (e.g., environmental noise) of the wireless signal, such as to avoid environmental influence obscuring the pathloss dip. The environmental influence may be estimated beforehand from the physical layer. Additionally, relevant environmental features may be communicated in an extended BSM message to improve the understanding of the expected signal behavior, which may characterize the estimated noise associated with one or more environment types.

The pathloss dip detection of first V2X occlusion mechanism 200 may be improved by selecting a message duration or frequency (e.g., interval between sent messages) to ensure detection of the pathloss dip. The message duration or frequency may be selected based on an expected occlusion duration, where both the sending and the receiving channels of the trusted devices are open and transmitting and may detect the pathloss dip. The occluding interval may depend on multiple factors, most importantly the speed and the dimension of an object. In an example, for a 4 m (13.12 ft) vehicle traveling 10 m/s (22.37 mph) it will take approximately $$\Delta t = \frac{\Delta x}{v} = \frac{4 \text{ m}}{\frac{10 \text{ m}}{\text{s}}} = 0.4 \text{ s}$$

for the vehicle to advance one full body length, which will be the duration of the direct LoS occlusion. Based on a typical signaling of frequency of 100 ms, four BSMs can be expected to be sent during 0.4 s, allowing the device to detect the occlusion event. In some examples, the messaging frequency may be increased to improve pathloss detection. Additional message timing considerations are discussed below with respect to FIG. 9.

The pathloss dip detection of first V2X occlusion mechanism 200 may be improved by modifying a trust level of the device for which the pathloss drop is observed. A pathloss dip caused by an untrusted vehicle may be an indication of a malicious actor. Strategies to identify trusted members is described below with respect to FIG. 6. Any increase in the number of trusted members increases the ability of the first V2X occlusion mechanism 200 to detect a pathloss dip.

Figure 3:
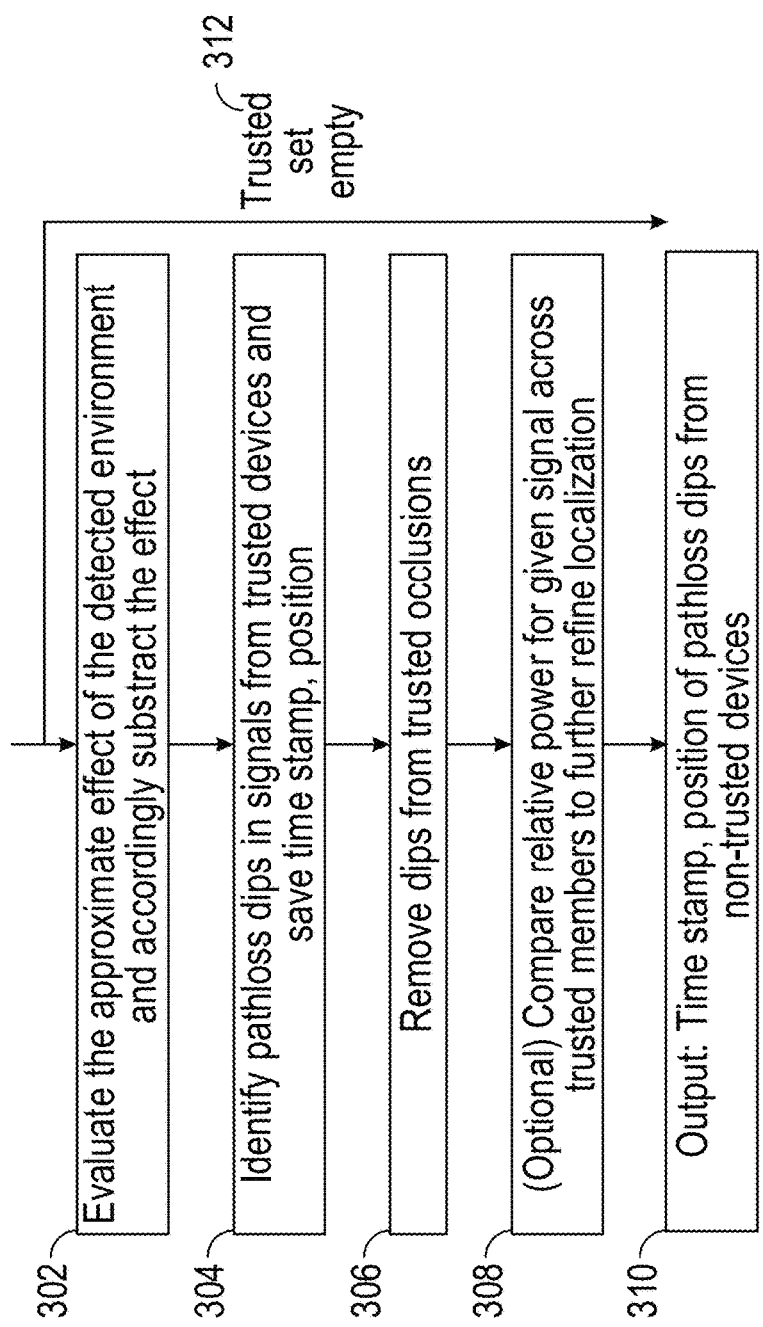
FIG. 3 is a flowchart of an advanced security module method, according to an embodiment.

FIG. 3 is a flowchart of an advanced security module method 300, according to an embodiment. Method 300 summarizes processing steps performed in the advanced security module 118 to identify relevant pathloss dips. Method 300 may include evaluating 302 an approximate effect of detected environment and offset the effect. Method 300 may include identifying 304 pathloss dips in signals from trusted devices, then saving time stamp and position information. Method 300 may include removing 306 dips from trusted occlusions. These trusted occlusions include occlusion events in which both the occluding device and the occluded devices (e.g., receivers) are trusted members. Method 300 may optionally include comparing relative power for a given signal across trusted members to further refine localization. Method 300 may output a time stamp and position of pathloss dips from non-trusted device. If method 300 does not identify a trusted member, then method 300 may return 312 an empty trusted set.

Figure 4:
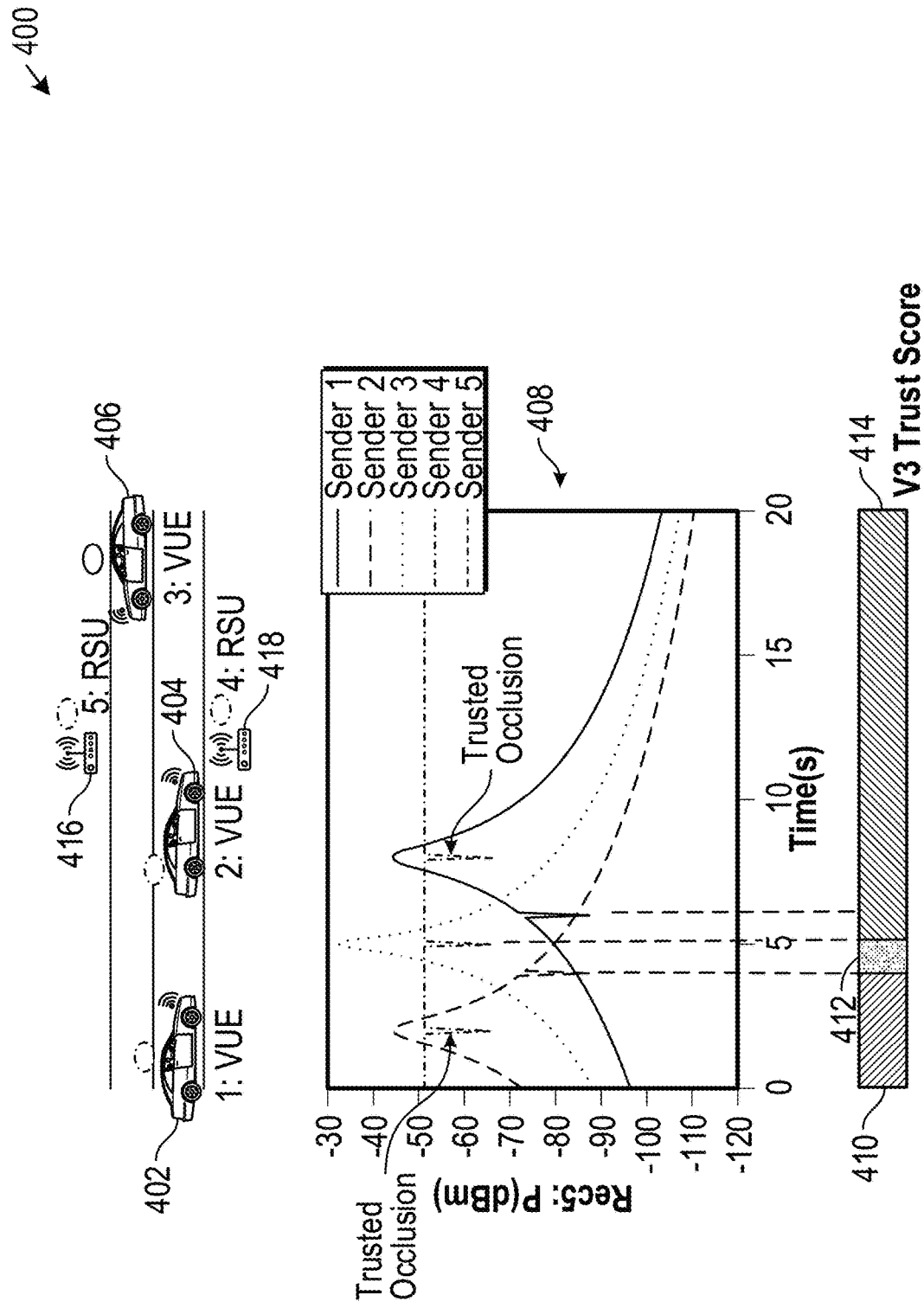
FIG. 4 is a schematic drawing illustrating a second V2X occlusion mechanism, according to an embodiment.

FIG. 4 is a schematic drawing illustrating a second V2X occlusion mechanism 400, according to an embodiment. Trusted RSUs 418 and 416 and trusted VUEs 402 and 404 may provide signal information, which may be used to determine a trust score potential attacker VUE 406. Signal strength plot 408 shows three pathloss dips related to potential attacker VUE 406 under investigation are shown as registered from RSU 416 (e.g., signals originating from trusted RSU 418 and trusted VUEs 402 and 404. These three pathloss dips allow for three consecutive updates of the estimated position and trust score, and therefore a high chance of detecting misbehavior. Each of the three pathloss dips may be associated with trust scores, such as a low trust score 410, a middle trust score 412, and a high trust score 414. This increased number of trusted devices increases the detection ability of V2X occlusion mechanism 400.

Figure 5:
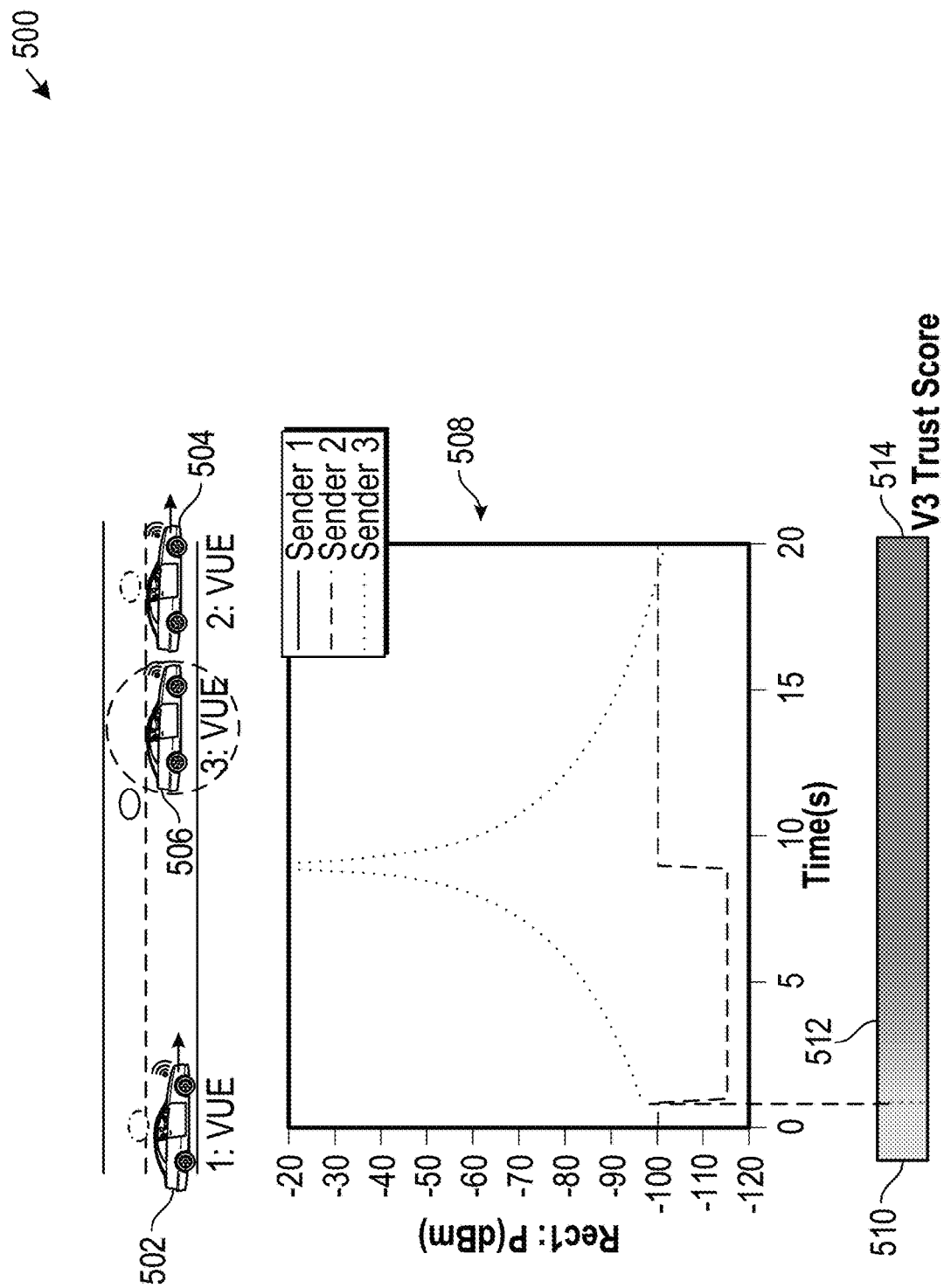
FIG. 5 is a schematic drawing illustrating a third V2X occlusion mechanism, according to an embodiment.

FIG. 5 is a schematic drawing illustrating a third V2X occlusion mechanism 500, according to an embodiment. Trusted VUE 502 may be following trusted VUE 504, and untrusted VUE 506 may merge between trusted 502 and trusted VUE 504 at t=1 s. The pathloss dip may result in a change from a low trust score 510 to middle trust score 514. In another example, if a malicious actor falsely reports a position of a vehicle between trusted 502 and trusted VUE 504 but no pathloss dip is detected, the trust score may be lowered to indicate the position report may be malicious. This detection of a false position report may be used to improve safety, such as by avoiding or modifying safety-critical brake or evasive maneuvers.

FIG. 6 is a flowchart of a trust evaluator module method 600, according to an embodiment. Method 600 may include receiving 602 time stamp information and position of pathloss dips from non-trusted devices. Method 600 may include selecting 604 an untrusted signal. Method 600 may include calculating 608 a position of the selected VUE at the time of the relevant observed occlusion event. This may include predicting or retrodicting the position of the selected VUE at a future time or a past time, respectively. A relevant occlusion event may be identified as an occlusion event that is not further away in time from the point of message reception than a given event time delay threshold. This event time delay threshold may be determined based on a predictive power associated with a chosen prediction model (e.g., constant velocity, constant turn rate). For example, if a constant velocity model is chosen, the event time delay threshold (e.g., prediction horizon) may be assumed to be a of the order of a few seconds, such that occlusion events that are a longer time ago or farther in the future should not be considered in the analysis due to the limited predictive power. Method 600 may include determining 610 whether the time and position of the observed occlusion event matches those of the predicted position of the sender under investigation. When the time and positions match, the trust score is increased 612, otherwise the trust score is decreased 614.

Figure 7:
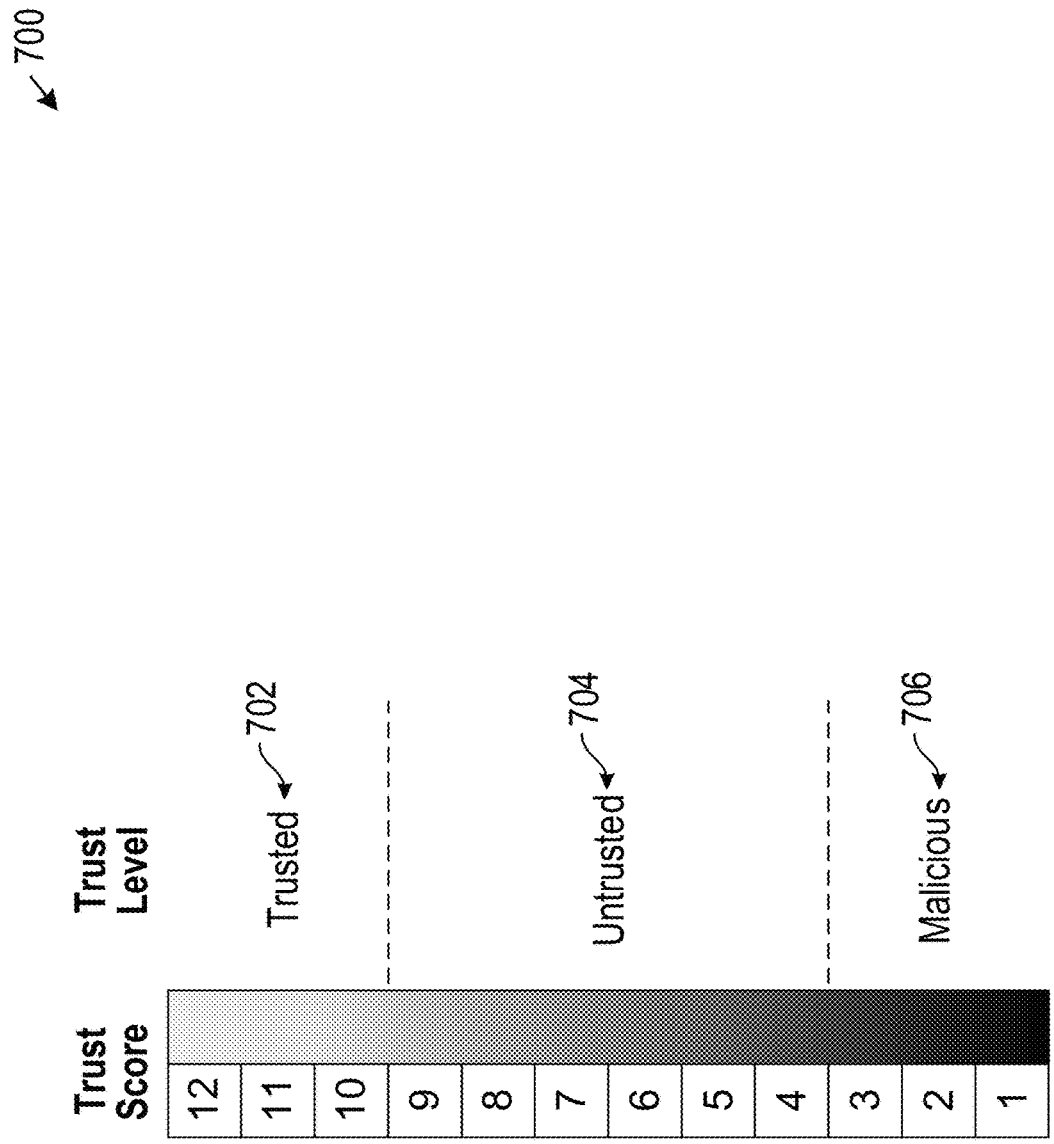
FIG. 7 is a schematic drawing illustrating incremental trust scores, according to an embodiment.

FIG. 7 is a schematic drawing illustrating incremental trust scores 700, according to an embodiment. Incremental trust scores 700 may provide additional trust levels to address false positive and other signal anomalies. In some examples, the cause for the signal attenuation might be the occlusion of the line of sight by an object other than the considered VUE. In this case, the VUE might send an incorrect position, but the advanced security module may confirm the content, because another object accidentally produces an occlusion at that very same location and time (e.g., false positive). Even though this may happen occasionally, a series of subsequent false positives of this type is statistically unlikely. To be more robust against such signal anomalies, the trust level may be subdivided into multiple trust score levels, and the trust score may be decreased or increased incrementally in sufficiently small steps. By using multiple trust score values and incremental changes, a few false positives and negatives can be handled without a change of the trust level. The trust score may them be mapped onto three discrete trust levels, such as trusted 702, untrusted 704, and malicious 706.

The line of sight between two trusted devices can be occluded by more than one vehicle at the same time. In some cases, the additional pathloss can be reconstructed from the signal, however, the presence of additional untrusted devices may be hidden if the pathloss due to the first occlusion is already very significant. This effect may be reduced or eliminated by stipulating the trust score is not increased if other untrusted occlusions were registered in the same LoS.

A pathloss dip may not be observed due to the limited temporal resolution of the signal exchange, such as in the case of a false negative. To reduce or eliminate this possibility, because the position of a device under consideration can be estimated, it is possible to temporarily modify the signal frequency to increase the temporal resolution. This way, a LoS occlusion may be observed with higher accuracy.

Figure 8:
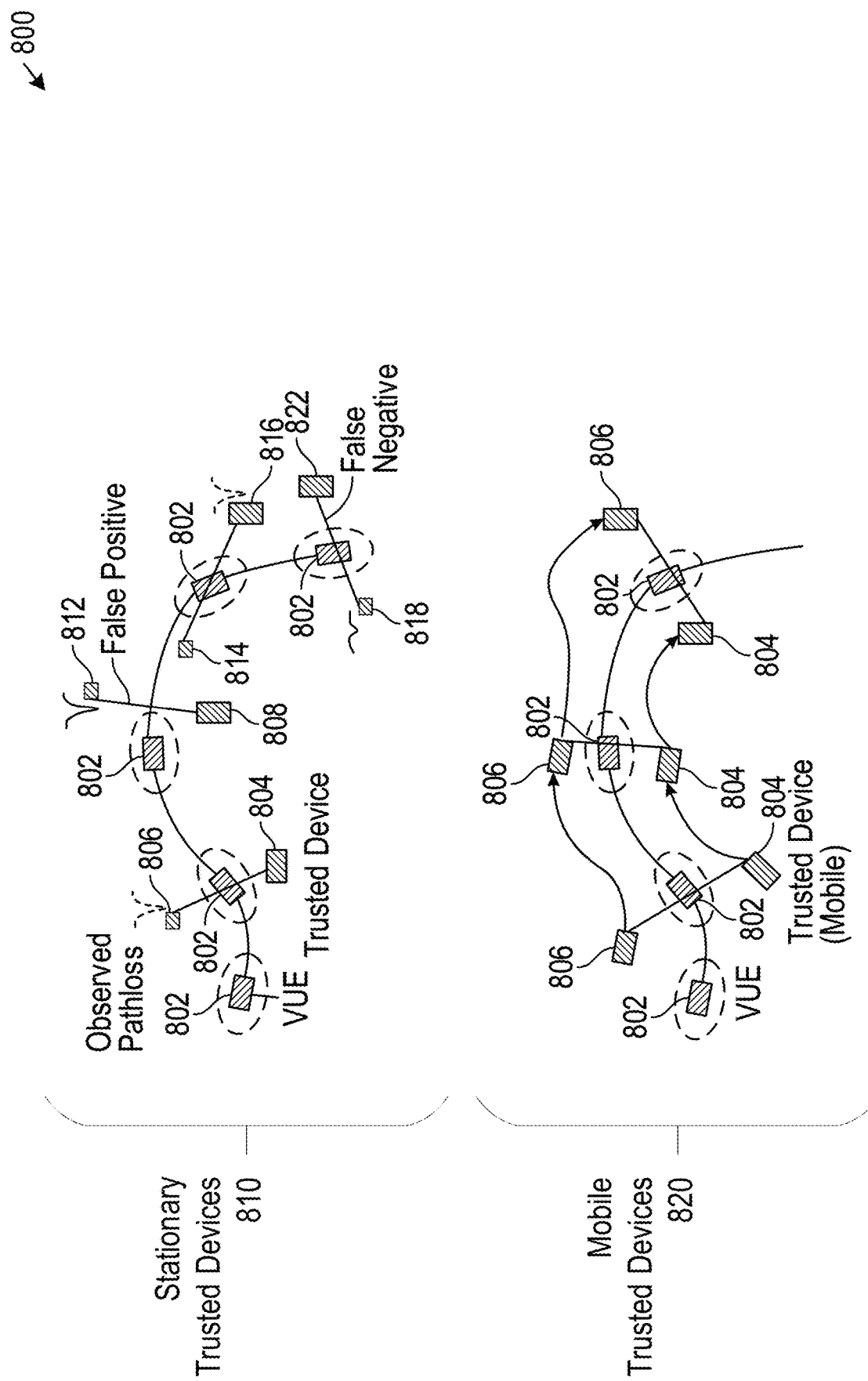
FIG. 8 is a schematic drawing illustrating an association method, according to an embodiment.

FIG. 8 is a schematic drawing illustrating an association method 800, according to an embodiment. Method 800 may provide for pathloss dip detection for stationary trusted devices 810 and for mobile trusted devices 820. Method 800 may use stationary trusted devices 810, where an untrusted VUE 802 may pass between multiple pairs of trusted devices 804 and 806, 808 and 812, 814 and 816, and 818 and 822. An associated pathloss dip confirms the presence of VUE 802 and supports a correct BSM content. False positive and false negative signals may be detected and reduced or eliminated, such as described above.

Method 800 may use mobile trusted devices 820, where trusted mobile VUEs 804 and 806 may be coordinated to move to strategic positions to verify the position of target VUE 802, which may allow for a more systematic misbehavior detection. In situations where mobile trusted devices are available, the confirmation of the position of an object under investigation can be enforced in a more systematic way. As shown in FIG. 8, trusted mobile VUEs 804 and 806 may be coordinated to move into strategic positions such that their line of sight may be occluded purposefully by the target vehicle. In an example, an untrusted robotaxi may contact an operator and transmit its current location. An incorrect position report may result in an inefficient schedule of the robotaxi, or may result in a failure of the taxi to arrive at the correct next destination. Method 800 may first determine whether stationary trusted devices 810 are available to verify the robotaxi position. If an insufficient number of static devices are available, method 800 may dispatch mobile trusted devices 820. In the robotaxi example, an operator may dispatch two trusted robotaxis in the area to verify the signal origin location reported by the untrusted robotaxi. By following the target for a short time and observing the pathloss occlusion characteristics, the two trusted robotaxis are able to verify that there is an object at the reported location, and to determine that the signal origin location reported by the untrusted robotaxi BSM content is correct.

Figure 9:
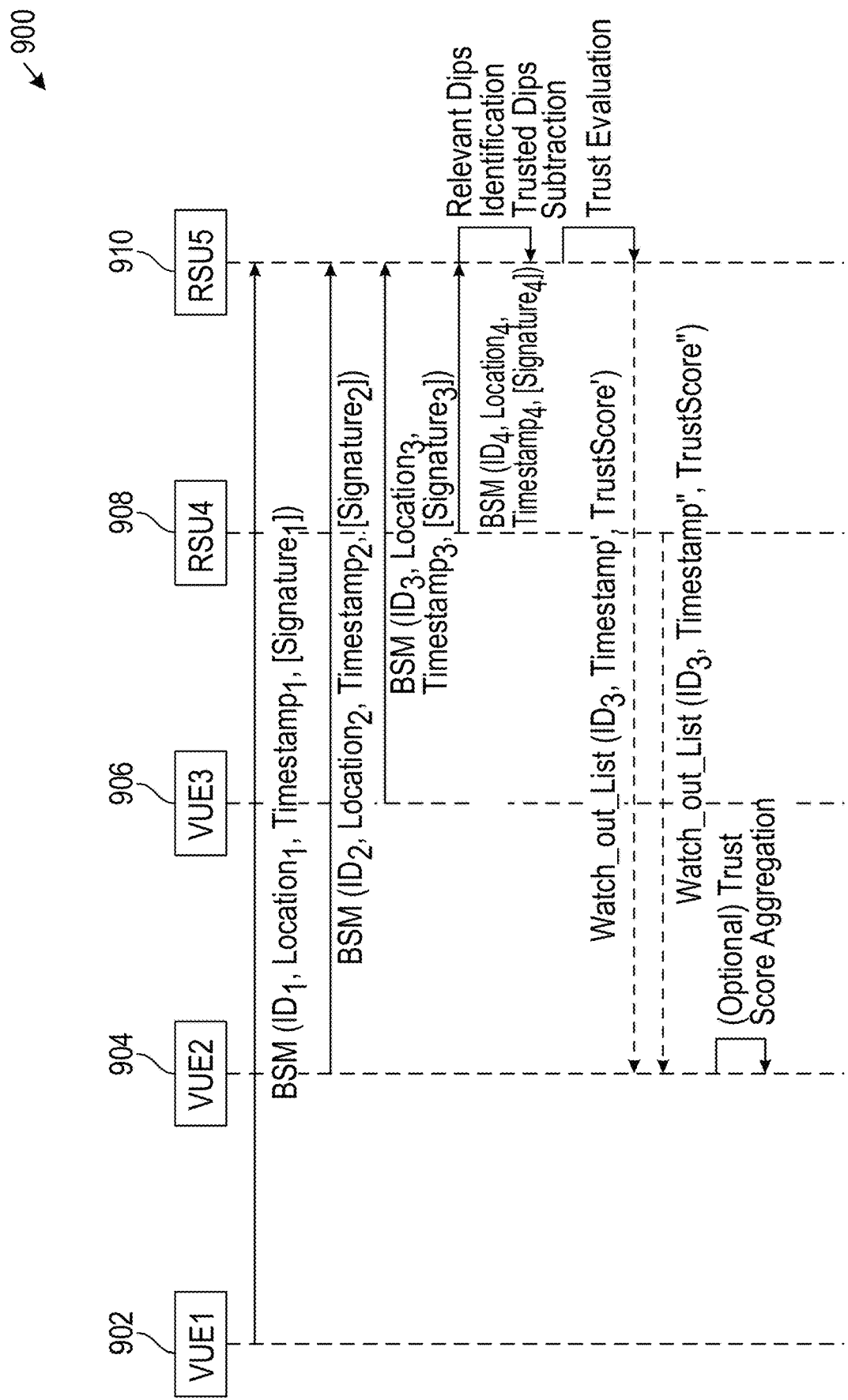
FIG. 9 is a schematic drawing illustrating a message exchange, according to an embodiment.

FIG. 9 is a schematic drawing illustrating a message exchange 900, according to an embodiment. Message exchange 900 may provide BSM communication between multiple devices, such as VUE1 902, VUE2 904, VUE3 906, RSU4 908, and RSU5 910. The message exchange 900 shown in FIG. 9 is an example of a set of messages that may be exchanged in the configuration shown in FIG. 4. Message exchange 900 illustrates the message exchange process at the application layer, which may be used in detection of a misbehaving node, such as a ghost attack by an entity posing as VUE3 906. Message exchange 900 may be used in multiple nearby RSU nodes. While FIG. 9 shows the trust evaluation process at RSU5 910, a similar process would apply to RSU4 908. Message exchange 900 may be used in distribution of watch-out-list in the neighborhood. Message exchange 900 may also be used in aggregating trust scores for unknown vehicles received from multiple trusted reporters or RSUs.

Message exchange 900 may be exchanged using various wireless communication protocols. To provide the relevant features, the wireless communication should a simultaneous two-way message exchange over the described time scale. Examples of such wireless communication protocols include IEEE 802.11p, DSRC, 4G-LTE, 5G, and other wireless communication protocols. These protocols typically operate below 6 GHz (e.g., 5.9 GHz) with vehicular transmit power often in the range of 23-33 dBm. Due to the dynamic environment, vehicles moving at high speed (e.g., up to 240 Km/h (150 mph) considering bi-directional relative speed), and low antenna heights, the LOS links between two vehicles may be blocked by other vehicles, causing 15-20 dB additional attenuation and an increase in the root-mean-square delay spread by 100 ns. The higher layer of these protocols allows each vehicle to periodically broadcast BSMs, which may include vehicle position, speed, direction, timestamp, and other information. These BSMs may be 300 bytes to 1400 bytes long. To reduce or eliminate the half-duplex problem (e.g., two vehicles simultaneously transmitting), the MAC layer may allow repetition of same BSM message on multiple subframes, which helps improve the reliability of bi-directional message delivery. Message exchange 900 may use these wireless communication protocols to improve misbehavior detection and to generate a list of potential attackers in the network. This information may be acquired by the trusted members that collaborate to verify the misbehavior, and this information may be shared readily across the trusted members. The list of potentially malicious nodes may be distributed to other devices, such as in the form of a subscription service. Those subscribers may then benefit from additional security even if they do not themselves have the capability or the trust level to detect misbehavior.

Various configurations may be used depending on the availability of an authorized distribution node. If no authorized distribution node is available, a secure service may not be provided, and each device may then maintain only its own internal database and handle detected attackers accordingly. If all trusted members have agreed on an authorized distribution node, this authorized distribution node may act as a service provider to any subscribed network device. This authorized distribution collects the information about detected misbehavior from all trusted devices, then stores and updates the corresponding IDs in a global "watch-out" list. The reliability of such a system may be improved by using RSUs as distribution nodes, as RSUs are statically likely to be more available, and their integrity may be certified by the operator. The IDs in the watch-out list may be anonymized or encrypted to provide improved privacy. A decryption key may be exchanged during the service subscription process. The watch-out list may then be broadcast as a service via V2X. In an example, the content of the watch-out message may include the following:

Watch_out_list=[(ID_distribution_node, timestamp_message),
(ID_1, timestamp_1, trust_score_1, trust_level_1),
(ID_2, timestamp_2, trust_score_2, trust_level_2), . . .
]

In this watch-out list structure, indices (e.g., 1, 2, etc.) refer to all devices that have been identified as malicious, and timestamp_1 represents the last time frame when this misbehavior was detected. Malicious IDs may be deleted from the list after a predetermined period, such as whenever a time since the traverses an expiration time threshold.

Figure 10:
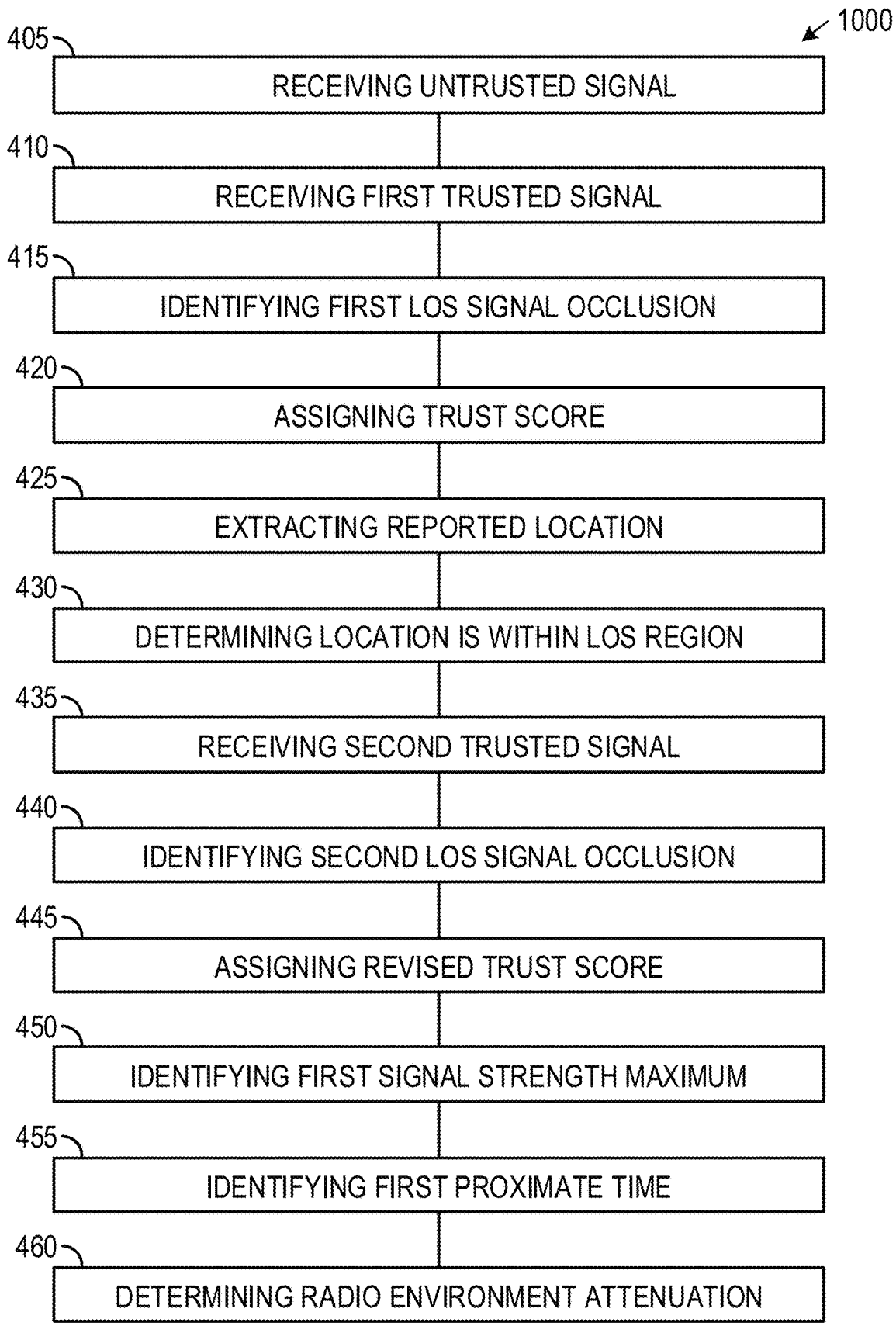
FIG. 10 is a schematic drawing illustrating a method, according to an embodiment.

FIG. 10 is a schematic drawing illustrating a method 1000, according to an embodiment. Method 1000 may include receiving 1005 an untrusted signal from an untrusted mobile source at a first trusted source. The untrusted signal may indicate that the untrusted mobile device is within range of the first trusted device. Method 1000 may include receiving 1010 a first trusted signal from a second trusted source at the first trusted source. Method 1000 may include identifying 1015 a first line-of-sight (LOS) signal occlusion of the first trusted signal. The first LOS signal occlusion may indicate the untrusted mobile source passed between the first trusted source and the second trusted source. Method 1000 may include assigning 1020 a trust score based on the untrusted signal and the LOS signal occlusion.

Method 1000 may include extracting 1025 a reported mobile source location of the untrusted mobile source from the untrusted signal. Method 1000 may include determining 1030 the reported mobile source location is within a LOS region. The LOS region may include the direct LOS path between the first trusted source and the second trusted source. The assignment of the trust score may include increasing the trust score based on the determination that the reported mobile source location is within the LOS region.

Method 1000 may include receiving 1035 a second trusted signal from the second trusted source at a third trusted source. Method 1000 may include identifying 1040 a second LOS signal occlusion of the second trusted signal. The second LOS signal occlusion may indicate the untrusted mobile source passed between the second trusted source and the third trusted source. Method 1000 may include assigning 1045 a revised trust score based on the untrusted signal and the LOS signal occlusion.

Method 1000 may include identifying 1050 a first untrusted signal strength maximum of the untrusted signal. Method 1000 may include identifying 1055 a first proximate time associated with the first untrusted signal strength maximum. The first proximate time may indicate when the untrusted mobile source is closest to the first trusted source. The assignment of the trust score may be based further on the first proximate time.

Method 1000 may include determining 1060 a radio environment attenuation based on a first transmit power and a first received power of the first trusted signal. The identification of the first LOS signal occlusion may be further based on the radio environment attenuation. In an example, the first trusted source and the second trusted source are stationary, and the first LOS signal occlusion includes a momentary signal strength drop within the first trusted signal, the momentary signal strength drop lasting less than one second. In another example, the first trusted source and the second trusted source are mobile, and the first LOS signal occlusion includes an extended signal strength drop within the first trusted signal, the extended signal strength drop lasting at least one second.

Figure 11:
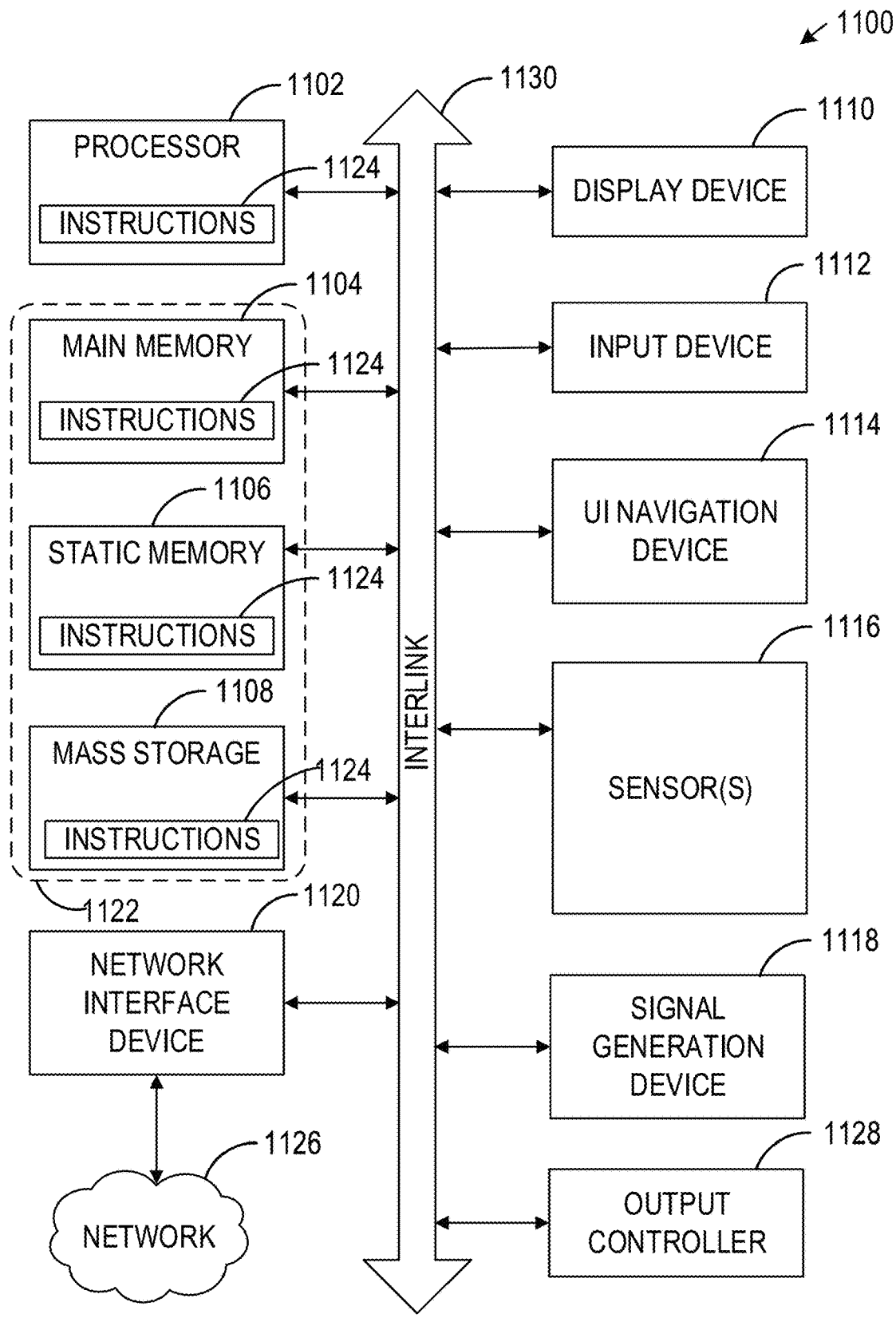
FIG. 11 is a block diagram illustrating a machine in the example form of a computer system, within which a set or sequence of instructions may be executed to cause the machine to perform any one of the methodologies discussed herein, according to an embodiment.

FIG. 11 is a block diagram illustrating a machine in the example form of a computer system 1100, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus). The computer system 1100 may further include a video display unit 1110, an alphanumeric input device 1112 (e.g., a keyboard), and a user interface (UI) navigation device 1114 (e.g., a mouse). In one embodiment, the video display unit 1110, input device 1112 and UI navigation device 1114 are incorporated into a touch screen display. The computer system 1100 may additionally include a storage device 1116 (e.g., a drive unit), a signal generation device 1118 (e.g., a speaker), a network interface device 1120, and one or more sensors (not shown), such as a global positioning system (GPS) sensor, compass, accelerometer, gyroscope sensor, inertial sensor, magnetometer, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Example 1 is at least one non-transitory machine-readable storage medium, comprising a plurality of instructions that, responsive to being executed with processor circuitry of a computing device, cause the computing device to: receive an untrusted signal from an untrusted mobile source at a first trusted source, the untrusted signal indicating that the untrusted mobile source is within range of the first trusted source; receive a first trusted signal from a second trusted source at the first trusted source; identify a first line-of-sight (LOS) signal occlusion of the first trusted signal, the first LOS signal occlusion indicating the untrusted mobile source passed between the first trusted source and the second trusted source; and assign a trust score based on the untrusted signal and the LOS signal occlusion.

In Example 2, the subject matter of Example 1 includes, the instructions further causing the computing device to: extract a reported mobile source location of the untrusted mobile source from the untrusted signal; and determine the reported mobile source location is within a LOS region, the LOS region including the direct LOS path between the first trusted source and the second trusted source; wherein the assignment of the trust score includes increasing the trust score based on the determination that the reported mobile source location is within the LOS region.

In Example 3, the subject matter of Examples 1-2 includes, the instructions further causing the computing device to: receive a second trusted signal from the second trusted source at a third trusted source; identify a second LOS signal occlusion of the second trusted signal, the second LOS signal occlusion indicating the untrusted mobile source passed between the second trusted source and the third trusted source; and assign a revised trust score based on the untrusted signal and the LOS signal occlusion.

In Example 4, the subject matter of Examples 1-3 includes, the instructions further causing the computing device to: identify a first untrusted signal strength maximum of the untrusted signal; and identify a first proximate time associated with the first untrusted signal strength maximum, the first proximate time indicating when the untrusted mobile source is closest to the first trusted source; wherein the assignment of the trust score is further based on the first proximate time.

In Example 5, the subject matter of Examples 1-4 includes, the instructions further causing the computing device to determine a radio environment attenuation based on a first transmit power and a first received power of the first trusted signal, wherein the identification of the first LOS signal occlusion is further based on the radio environment attenuation.

In Example 6, the subject matter of Examples 1-5 includes, wherein: the first trusted source and the second trusted source are stationary; and the first LOS signal occlusion includes a momentary signal strength drop within the first trusted signal, the momentary signal strength drop lasting less than one second.

In Example 7, the subject matter of Examples 1-6 includes, wherein: the first trusted source and the second trusted source are mobile; and the first LOS signal occlusion includes an extended signal strength drop within the first trusted signal, the extended signal strength drop lasting at least one second.

Example 8 is a system for determining trusted agent devices, the system comprising: a wireless radio device to: receive an untrusted signal from an untrusted mobile source at a first trusted source, the untrusted signal indicating that the untrusted mobile source is within range of the first trusted source; and receive a first trusted signal from a second trusted source at the first trusted source; processing circuitry; and a memory that includes, instructions, the instructions, when executed by the processing circuitry, cause the processing circuitry to: identify a first line-of-sight (LOS) signal occlusion of the first trusted signal, the first LOS signal occlusion indicating the untrusted mobile source passed between the first trusted source and the second trusted source; and assign a trust score based on the untrusted signal and the LOS signal occlusion.

In Example 9, the subject matter of Example 8 includes, the instructions further causing the processing circuitry to: extract a reported mobile source location of the untrusted mobile source from the untrusted signal; and determine the reported mobile source location is within a LOS region, the LOS region including a direct LOS path between the first trusted source and the second trusted source; wherein the assignment of the trust score includes increasing the trust score based on the determination that the reported mobile source location is within the LOS region.

In Example 10, the subject matter of Examples 8-9 includes, the instructions further causing the processing circuitry to: receive a second trusted signal from the second trusted source at a third trusted source; identify a second LOS signal occlusion of the second trusted signal, the second LOS signal occlusion indicating the untrusted mobile source passed between the second trusted source and the third trusted source; and assign a revised trust score based on the untrusted signal and the LOS signal occlusion.

In Example 11, the subject matter of Examples 8-10 includes, the instructions further causing the processing circuitry to: identify a first untrusted signal strength maximum of the untrusted signal; and identify a first proximate time associated with the first untrusted signal strength maximum, the first proximate time indicating when the untrusted mobile source is closest to the first trusted source; wherein the assignment of the trust score is further based on the first proximate time.

In Example 12, the subject matter of Examples 8-11 includes, the instructions further causing the processing circuitry to determine a radio environment attenuation based on a first transmit power and a first received power of the first trusted signal, wherein the identification of the first LOS signal occlusion is further based on the radio environment attenuation.

In Example 13, the subject matter of Examples 8-12 includes, wherein: the first trusted source and the second trusted source are stationary; and the first LOS signal occlusion includes a momentary signal strength drop within the first trusted signal, the momentary signal strength drop lasting less than one second.

In Example 14, the subject matter of Examples 8-13 includes, wherein: the first trusted source and the second trusted source are mobile; and the first LOS signal occlusion includes an extended signal strength drop within the first trusted signal, the extended signal strength drop lasting at least one second.

Example 15 is a method of determining trusted agent devices, the method comprising: receiving an untrusted signal from an untrusted mobile source at a first trusted source, the untrusted signal indicating that the untrusted mobile source is within range of the first trusted source; receiving a first trusted signal from a second trusted source at the first trusted source; identifying a first line-of-sight (LOS) signal occlusion of the first trusted signal, the first LOS signal occlusion indicating the untrusted mobile source passed between the first trusted source and the second trusted source; and assigning a trust score based on the untrusted signal and the LOS signal occlusion.

In Example 16, the subject matter of Example 15 includes, extracting a reported mobile source location of the untrusted mobile source from the untrusted signal; and determining the reported mobile source location is within a LOS region, the LOS region including a direct LOS path between the first trusted source and the second trusted source; wherein the assignment of the trust score includes increasing the trust score based on the determination that the reported mobile source location is within the LOS region.

In Example 17, the subject matter of Examples 15-16 includes, receiving a second trusted signal from the second trusted source at a third trusted source; identifying a second LOS signal occlusion of the second trusted signal, the second LOS signal occlusion indicating the untrusted mobile source passed between the second trusted source and the third trusted source; and assigning a revised trust score based on the untrusted signal and the LOS signal occlusion.

In Example 18, the subject matter of Examples 15-17 includes, identifying a first untrusted signal strength maximum of the untrusted signal; and identifying a first proximate time associated with the first untrusted signal strength maximum, the first proximate time indicating when the untrusted mobile source is closest to the first trusted source; wherein the assignment of the trust score is further based on the first proximate time.

In Example 19, the subject matter of Examples 15-18 includes, determining a radio environment attenuation based on a first transmit power and a first received power of the first trusted signal, wherein the identification of the first LOS signal occlusion is further based on the radio environment attenuation.

In Example 20, the subject matter of Examples 15-19 includes, wherein: the first trusted source and the second trusted source are stationary; and the first LOS signal occlusion includes a momentary signal strength drop within the first trusted signal, the momentary signal strength drop lasting less than one second.

In Example 21, the subject matter of Examples 15-20 includes, wherein: the first trusted source and the second trusted source are mobile; and the first LOS signal occlusion includes an extended signal strength drop within the first trusted signal, the extended signal strength drop lasting at least one second.

Example 22 is at least one machine-readable medium including instructions, which when executed by a computing system, cause the computing system to perform any of the methods of Examples 15-21.

Example 23 is an apparatus comprising means for performing any of the methods of Examples 15-21.

Example 24 is an apparatus for determining trusted agent devices, the apparatus comprising: means for receiving an untrusted signal from an untrusted mobile source at a first trusted source, the untrusted signal indicating that the untrusted mobile source is within range of the first trusted source; means for receiving a first trusted signal from a second trusted source at the first trusted source; means for identifying a first line-of-sight (LOS) signal occlusion of the first trusted signal, the first LOS signal occlusion indicating the untrusted mobile source passed between the first trusted source and the second trusted source; and means for assigning a trust score based on the untrusted signal and the LOS signal occlusion.

In Example 25, the subject matter of Example 24 includes, means for extracting a reported mobile source location of the untrusted mobile source from the untrusted signal; and means for determining the reported mobile source location is within a LOS region, the LOS region including the direct LOS path between the first trusted source and the second trusted source; wherein the assignment of the trust score includes increasing the trust score based on the determination that the reported mobile source location is within the LOS region.

In Example 26, the subject matter of Examples 24-25 includes, means for receiving a second trusted signal from the second trusted source at a third trusted source; means for identifying a second LOS signal occlusion of the second trusted signal, the second LOS signal occlusion indicating the untrusted mobile source passed between the second trusted source and the third trusted source; and means for assigning a revised trust score based on the untrusted signal and the LOS signal occlusion.

In Example 27, the subject matter of Examples 24-26 includes, means for identifying a first untrusted signal strength maximum of the untrusted signal; and means for identifying a first proximate time associated with the first untrusted signal strength maximum, the first proximate time indicating when the untrusted mobile source is closest to the first trusted source; wherein the assignment of the trust score is further based on the first proximate time.

In Example 28, the subject matter of Examples 24-27 includes, means for determining a radio environment attenuation based on a first transmit power and a first received power of the first trusted signal, wherein the identification of the first LOS signal occlusion is further based on the radio environment attenuation.

In Example 29, the subject matter of Examples 24-28 includes, wherein: the first trusted source and the second trusted source are stationary; and the first LOS signal occlusion includes a momentary signal strength drop within the first trusted signal, the momentary signal strength drop lasting less than one second.

In Example 30, the subject matter of Examples 24-29 includes, wherein: the first trusted source and the second trusted source are mobile; and the first LOS signal occlusion includes an extended signal strength drop within the first trusted signal, the extended signal strength drop lasting at least one second.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. At least one non-transitory machine-readable storage medium, comprising a plurality of instructions that, responsive to being executed with processor circuitry of a computing device, cause the computing device to:
   receive an untrusted signal from an untrusted mobile source at a first trusted source, the untrusted signal indicating that the untrusted mobile source is within range of the first trusted source;
   receive a first trusted signal from a second trusted source at the first trusted source;
   identify a first line-of-sight (LOS) signal occlusion of the first trusted signal, the first LOS signal occlusion indicating the untrusted mobile source passed between the first trusted source and the second trusted source; and
   assign a trust score based on the untrusted signal and the LOS signal occlusion.

2. The non-transitory machine-readable storage medium of claim 1, the instructions further causing the computing device to:
   extract a reported mobile source location of the untrusted mobile source from the untrusted signal; and
   determine the reported mobile source location is within a LOS region, the LOS region including the direct LOS path between the first trusted source and the second trusted source;
   wherein the assignment of the trust score includes increasing the trust score based on the determination that the reported mobile source location is within the LOS region.

3. The non-transitory machine-readable storage medium of claim 1, the instructions further causing the computing device to:
   receive a second trusted signal from the second trusted source at a third trusted source;
   identify a second LOS signal occlusion of the second trusted signal, the second LOS signal occlusion indicating the untrusted mobile source passed between the second trusted source and the third trusted source; and
   assign a revised trust score based on the untrusted signal and the LOS signal occlusion.

4. The non-transitory machine-readable storage medium of claim 1, the instructions further causing the computing device to:
   identify a first untrusted signal strength maximum of the untrusted signal; and
   identify a first proximate time associated with the first untrusted signal strength maximum, the first proximate time indicating when the untrusted mobile source is closest to the first trusted source;
   wherein the assignment of the trust score is further based on the first proximate time.

5. The non-transitory machine-readable storage medium of claim 1, the instructions further causing the computing device to determine a radio environment attenuation based on a first transmit power and a first received power of the first trusted signal, wherein the identification of the first LOS signal occlusion is further based on the radio environment attenuation.

6. The non-transitory machine-readable storage medium of claim 1, wherein:
   the first trusted source and the second trusted source are stationary; and the first LOS signal occlusion includes a momentary signal strength drop within the first trusted signal, the momentary signal strength drop lasting less than one second.

7. The non-transitory machine-readable storage medium of claim 1, wherein:
the first trusted source and the second trusted source are mobile; and
the first LOS signal occlusion includes an extended signal strength drop within the first trusted signal, the extended signal strength drop lasting at least one second.

8. A system for determining trusted agent devices, the system comprising:
a wireless radio device to:
receive an untrusted signal from an untrusted mobile source at a first trusted source, the untrusted signal indicating that the untrusted mobile source is within range of the first trusted source; and
receive a first trusted signal from a second trusted source at the first trusted source;
processing circuitry; and
a memory that includes instructions, the instructions, when executed by the processing circuitry, cause the processing circuitry to:
identify a first line-of-sight (LOS) signal occlusion of the first trusted signal, the first LOS signal occlusion indicating the untrusted mobile source passed between the first trusted source and the second trusted source; and
assign a trust score based on the untrusted signal and the LOS signal occlusion.

9. The system of claim 8, the instructions further causing the processing circuitry to:
extract a reported mobile source location of the untrusted mobile source from the untrusted signal; and
determine the reported mobile source location is within a LOS region, the LOS region including a direct LOS path between the first trusted source and the second trusted source;
wherein the assignment of the trust score includes increasing the trust score based on the determination that the reported mobile source location is within the LOS region.

10. The system of claim 8, the instructions further causing the processing circuitry to:
receive a second trusted signal from the second trusted source at a third trusted source;
identify a second LOS signal occlusion of the second trusted signal, the second LOS signal occlusion indicating the untrusted mobile source passed between the second trusted source and the third trusted source; and
assign a revised trust score based on the untrusted signal and the LOS signal occlusion.

11. The system of claim 8, the instructions further causing the processing circuitry to:
identify a first untrusted signal strength maximum of the untrusted signal; and
identify a first proximate time associated with the first untrusted signal strength maximum, the first proximate time indicating when the untrusted mobile source is closest to the first trusted source;
wherein the assignment of the trust score is further based on the first proximate time.

12. The system of claim 8, the instructions further causing the processing circuitry to determine a radio environment attenuation based on a first transmit power and a first received power of the first trusted signal, wherein the identification of the first LOS signal occlusion is further based on the radio environment attenuation.

13. The system of claim 8, wherein:
the first trusted source and the second trusted source are stationary; and
the first LOS signal occlusion includes a momentary signal strength drop within the first trusted signal, the momentary signal strength drop lasting less than one second.

14. The system of claim 8, wherein:
the first trusted source and the second trusted source are mobile; and
the first LOS signal occlusion includes an extended signal strength drop within the first trusted signal, the extended signal strength drop lasting at least one second.

15. An apparatus for determining trusted agent devices, the apparatus comprising:
means for receiving an untrusted signal from an untrusted mobile source at a first trusted source, the untrusted signal indicating that the untrusted mobile source is within range of the first trusted source;
means for receiving a first trusted signal from a second trusted source at the first trusted source;
means for identifying a first line-of-sight (LOS) signal occlusion of the first trusted signal, the first LOS signal occlusion indicating the untrusted mobile source passed between the first trusted source and the second trusted source; and
means for assigning a trust score based on the untrusted signal and the LOS signal occlusion.

16. The apparatus of claim 15, further including:
means for extracting a reported mobile source location of the untrusted mobile source from the untrusted signal; and
means for determining the reported mobile source location is within a LOS region, the LOS region including the direct LOS path between the first trusted source and the second trusted source;
wherein the assignment of the trust score includes increasing the trust score based on the determination that the reported mobile source location is within the LOS region.

17. The apparatus of claim 15, further including:
means for receiving a second trusted signal from the second trusted source at a third trusted source;
means for identifying a second LOS signal occlusion of the second trusted signal, the second LOS signal occlusion indicating the untrusted mobile source passed between the second trusted source and the third trusted source; and
means for assigning a revised trust score based on the untrusted signal and the LOS signal occlusion.

18. The apparatus of claim 15, further including:
means for identifying a first untrusted signal strength maximum of the untrusted signal; and
means for identifying a first proximate time associated with the first untrusted signal strength maximum, the first proximate time indicating when the untrusted mobile source is closest to the first trusted source;
wherein the assignment of the trust score is further based on the first proximate time.

19. The apparatus of claim 15, further including means for determining a radio environment attenuation based on a first transmit power and a first received power of the first trusted signal, wherein the identification of the first LOS signal occlusion is further based on the radio environment attenuation.

20. The apparatus of claim 15, wherein:
   the first trusted source and the second trusted source are stationary; and
   the first LOS signal occlusion includes a momentary signal strength drop within the first trusted signal, the momentary signal strength drop lasting less than one second.

21. The apparatus of claim 15, wherein:
   the first trusted source and the second trusted source are mobile; and
   the first LOS signal occlusion includes an extended signal strength drop within the first trusted signal, the extended signal strength drop lasting at least one second.

* * * * *